July 17, 1923.
C. E. STOCKHAM
POULTRY COOP
Filed July 26, 1922
1,461,989
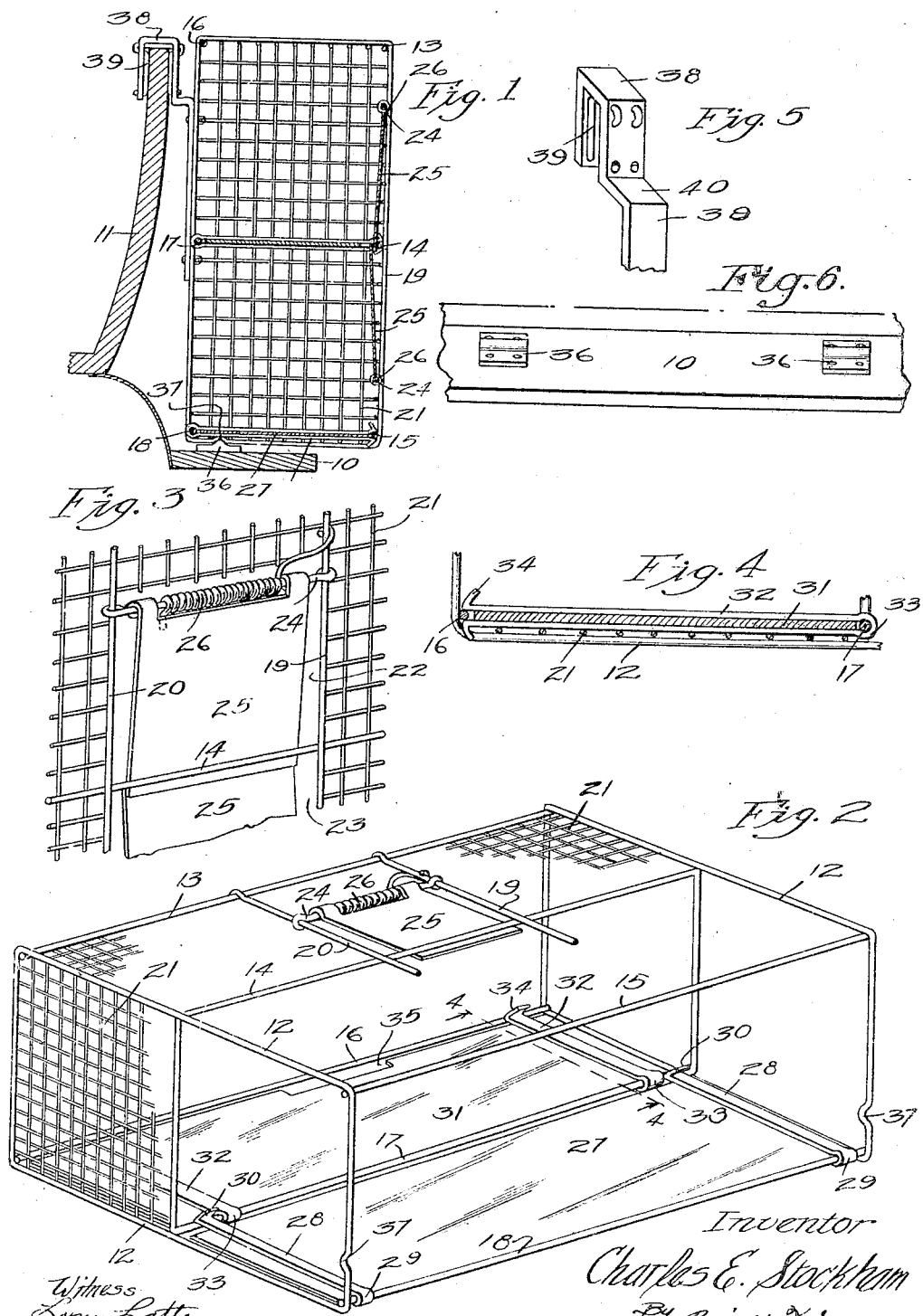
Inventor
Charles E. Stockham
By Bair & Freeman
Attys
Witness
Lynn Latta Patented July 17, 1923.

1,461,989

UNITED STATES PATENT OFFICE.

CHARLES E. STOCKHAM, OF OSKALOOSA, IOWA.

POULTRY COOP.

Application filed July 26, 1922. Serial No. 577,560.

*To all whom it may concern:*

Be it known that I, CHARLES E. STOCKHAM, a citizen of the United States, and a resident of Oskaloosa, in the county of Mahaska and State of Iowa, have invented a certain new and useful Poultry Coop, of which the following is a specification.

The object of my invention is to provide a poultry coop, especially adapted for carrying poultry on the running board of an automobile.

More particularly, my invention relates to a coop so arranged that when it is in one position a large single deck coop will be had, and when turned to another position a double deck coop will be had.

Still another object is to arrange the floor of the coop, so that it is capable of being swung to various positions for serving as a floor when the coop is used as a single deck coop and as a floor when the coop is moved to position where it serves as a double deck coop.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is an end view of my coop shown on the running board of an automobile.

Figure 2 is a perspective view of my coop shown in position where it is a single deck coop.

Figure 3 is a detail, perspective view of the doors for gaining access to the interior of the coop.

Figure 4 is a detail, sectional view taken on the line 4—4 of Figure 2.

Figure 5 is a detail, perspective view of one end of the hook member for securing the coop to the automobile body; and Figure 6 is a perspective view of the running board of an automobile with cleats shown thereon for engagement with the coop.

In the accompanying drawings, I have used the reference numeral 10 to indicate generally the running board of an automobile and 11 the body thereof.

My coop consists of a wire frame structure A. The wire frame structure A consists of a pair of rectangular frame members 12, which are connected together by a number of cross wires 13, 14, 15, 16, 17 and 18. The wire members just described form the entire frame for the coop.

A pair of cross wires 19 and 20 have their ends connected to the wires 13 and 15 and pass over the wire 15. The wire members of the frame may be spot-welded or connected in any other suitable manner.

On the inner side of the framework formed by the wires heretofore mentioned is placed a screen netting 21. The screen netting 21 provides a complete coop.

Door openings 22 and 23 are provided in the screen netting 21 and are positioned between the two wires 19 and 20.

Secured to the cross wires 19 and 20 are the pintle rods 24. Mounted on each of the pintle rods 24 is a swinging door member 25.

A coil spring 26 is positioned on each of the pintle rods 24 and has one end in engagement with the door 25 and its other end permanently anchored to the wire member 19.

The springs 26 tend to normally hold the doors 25 in their closed position.

The doors 25 are designed to be shoved inwardly for gaining access into the interior of the coop. Each of the free ends of the doors 25 project slightly beyond the center cross wire 14, so that it serves as a stop member for limiting the movement of the doors 25.

Hinged to the cross wire 18 is a sheet metal floor member 27. The sheet metal floor member 27 is reinforced with straps 28, which have loops 29 formed therein, which receive the wire 18. The ends of the straps 28 are provided with hook portions 30. The purpose of the hook portions 30 will be hereinafter more fully set forth.

A floor member 31 is also provided, which has reinforcing straps 32 thereon. The reinforcing straps 32 are similar in construction to the straps 28 and are also provided with loops 33.

Hook members 34 are provided on the free ends of the straps 32.

When the coop is in the position shown in Figure 2 of the drawings, the floor members 27 and 31 each cover substantially half of the floor space of the coop, so that together they form a complete floor.

When the coop is placed on one of its sides, then the floor member 27 is swung a quarter turn, so that the hook members 30 thereon will engage the wire 15 for holding it in proper position.

The floor member 31 will be swung a quarter turn, so that the hook members 34 will engage the wire member 14.

When the floor members 27 and 31 are in the position shown in Figure 2 of the drawings, then the hook members 30 engage the wire 17, while the hook members 34 engage the wire 16.

It will be seen that when the coop is placed on its side that a double deck coop is had.

The floor 31 is provided with a cut-out portion 35, so that when it is in position where it serves as a floor for the upper deck of the coop, it will not interfere with the swinging of the door members 25. The cut-out portion 35 is sufficiently large enough to permit the swinging of the doors 25.

On the running board 10 of the automobile, I mount a number of cleats 36, which coact with a notch 37 secured in the frame members 12 of the coop.

Secured to one side of the coop in any suitable manner is a yoke member 38, which has its upper end extended over the side of the automobile body 11. Ordinary wicking 39 may be woven into the yoke member 38, so as to prevent the marring of the automobile body. The yoke member 38 is also provided with an offset portion 40, so that the main portion of the coop is slightly spaced away from the body of the automobile so as to positively eliminate any engagement of the coop with the automobile body.

It will be seen that when the coop is used for shipping chickens in the ordinary manner, it may be laid flat with the floor members 27 and 31 serving as a complete floor, and when it is desired to haul a crate of chickens to town on the running board of an automobile, it may be placed on end. When the coop is placed on end, then the floor members are so moved that a double deck coop will be formed. When a double deck coop is formed, one of the doors 25 will serve for each of the compartments of the coop.

The parts of the coop are sufficiently resilient, so as to permit the hooks on the floor members to engage the various wire members necessary for holding them in proper position.

The arranging of the floor members, which are capable of swinging movement is very desirable in view of the fact that it permits the easy cleaning of the floors.

It will be understood that any number of decks may be had in my coop, by using any number of floor members, so long as each floor member is as wide as the coop is high.

The coop can successfully be used for carrying turkeys by placing it in the position it is in when used as a double decker, using however only one of the floor members, so that the coop is quite high.

It will be seen that the construction of my coop is such that a single coop may be used for shipping poultry of different kinds in substantially two different manners, namely, when the coop is placed on its side and when placed on its bottom.

It will be understood that while I have described and illustrated a coop made of wire and sheet metal floor members, it is possible to make a complete wooden coop, and it is my intention to cover in this application a coop made of wood or any other suitable material.

Some changes may be made in the arrangement and construction of the various parts of my device without departing from the essential features and purposes of my invention, and it is my intention to cover by my claims, any modified forms of structure or use of mechanical equivalents which may be reasonably included within their scope.

I claim as my invention:

1. A poultry coop of the class described including a coop member having a top, a bottom and side walls, floor members hingedly mounted in said coop, said floor members being so arranged that when they are in one position they collectively cover the bottom of the coop and when in another position each floor member extends from the bottom to the top for forming a coop having more than one deck.

2. A poultry coop of the class described including a coop member having a top, a bottom and side walls, floor members hingedly mounted in said coop, each of said floor members being substantially the same width as the height of said coop, said floor members being so arranged that when they are in one position they collectively cover the bottom of the coop and when in another position each floor member extends from the bottom to the top for forming a coop having more than one deck.

3. A poultry coop of the class described including a coop member having a top, a bottom and side walls, floor members hingedly mounted in said coop, said floor members being so arranged that when they are in one position they collectively cover the bottom of the coop and when in another position each floor member extends from the bottom to the top for forming a coop having more than one deck, and means for holding said floor members in either of positions against accidental hinged movement.

4. A poultry coop of the class described including a coop member having a top, a bottom and side walls, floor members hingedly mounted in said coop, each of said floor members being substantially the same width as the height of said coop, said floor members being so arranged that when they are in one position they collectively cover the bottom of the coop and when in another position each floor member extends from the bottom to the top for forming a coop having more than one deck, and hook members formed on each of floor members adapted to yieldingly engage parts of the coop for preventing movement of floor members as specified.

5. A poultry coop of the class described including coop member having a frame, and a bottom, top and side walls, floor members hingedly connected to said frame, each of said floor members being of the same width as the height of said coop, hook members formed on the free edges of said floor members, said hook members being designed to engage parts of the frame for preventing hinged movement, the parts being so arranged that when the floor members are in one position they will collectively cover the entire bottom of said coop and when swung a quarter turn will extend perpendicular to the top and bottom of the coop for forming a coop having more than one deck.

Des Moines, Iowa, July 20, 1922.

CHARLES E. STOCKHAM.